United States Patent [19]

Bigelow et al.

[11] Patent Number: 5,265,544
[45] Date of Patent: Nov. 30, 1993

[54] METHOD FOR AUTOMATICALLY CONTROLLING INCINERATION IN AN EXCREMENT DISPOSAL SYSTEM

[75] Inventors: Claude Bigelow, 149 Glendora Ave., Long Beach, Calif. 90803; Lane Bailey, Orem, Utah

[73] Assignee: Claude Bigelow, Long Beach, Calif.

[21] Appl. No.: 928,401

[22] Filed: Aug. 12, 1992

[51] Int. Cl.$^5$ .............................................. F23G 7/04
[52] U.S. Cl. ................................. 110/345; 110/238; 110/346
[58] Field of Search ................ 110/238, 345, 341, 346

[56] References Cited

U.S. PATENT DOCUMENTS

| | | |
|---|---|---|
| 3,741,134 | 6/1973 | Roberts et al. ............. 110/187 |
| 3,903,813 | 9/1975 | Pan ............................. 110/238 |
| 4,138,331 | 2/1979 | Frankel et al. ............. 110/345 |
| 5,156,098 | 10/1992 | Camp ........................ 110/238 |

*Primary Examiner*—Henry C. Yuen
*Attorney, Agent, or Firm*—Charles H. Thomas

[57] ABSTRACT

A method is provided for automatically controlling the incineration of solid wastes in a self contained toilet. A microcontroller is employed for generating an electronic holding tank level signal indicative of volume of material is a system holding tank and comparing that signal with a predetermined upper holding tank volume limit signal. A waste withdrawal pump is actuated to pump down the contents of the holding tank to a predetermined lower holding tank level once the upper holding tank volume limit has been reached. The contents of the holding tank are transferred to an incineration chamber, which is actuated to incinerate waste received from the holding tank. Actuation of the waste withdrawal pump and incineration is terminated once the holding tank level signal reaches the lower holding tank volume limit. The system also provides for recirculation of the waste in the holding tank to prevent solids from settling out therein. The slurry from the holding tank is automatically metered into the incineration chamber according to the temperature in the incineration chamber at a rate appropriate for complete incineration. The system employs a diagnostics routine to detect and identify malfunctions, and a maintenance routine to allow specific inputs to be displayed and to provide an interface for operator control.

15 Claims, 6 Drawing Sheets

METHOD FOR AUTOMATICALLY CONTROLLING INCINERATION IN AN EXCREMENT DISPOSAL SYSTEM

BACKGROUND OF THE INVENTION

1. Field of the Invention

The present invention relates to an automated system for controlling the incineration of solid wastes in an excrement disposal system.

2. Description of the Prior Art

Boats, motor homes, campers and other recreational vehicles have long been provided with toilets which the occupants of such vehicles utilize for the disposal of bodily wastes.

For many years, boats and yachts were constructed with toilets in which wastes were discharged directly into the sea. In such systems sea water was pumped from outside the vessel through the raw waste deposit container, typically a toilet bowl, and back out through a discharge outlet into the sea. In this manner sea water was pumped, either manually, or with the assistance of an electric motor, through a series of one way valves that discharged excrement and other wastes directly into the sea as raw sewage. Due to the vast volume of sea water this was considered to be an acceptable practice for quite some time. However, with the increased numbers of pleasure craft which began to crowd into desireable harbor and mooring areas, the discharge of raw sewage into the sea became unacceptable in waste disposal systems.

Other alternative toilet systems were devised for use on boats and other recreational vehicles. One type of system involves the use of a portable toilet, in which at least the initial receptacle for receiving unprocessed raw waste may be detached from beneath the toilet seat and emptied periodically into conventional toilets, or other sewage receptacles, which flow into municipal sewage systems. However, this type of portable toilet has a number of disadvantages. Because the raw waste cannot be emptied until an appropriate waste discharge facility is available, excrement must remain in portable toilets, sometimes for lengthy periods of time. Because the excrement reception containers must be removable, they are not air tight. Therefore, unpleasant odors from the raw waste receptacle tend to permeate the vessel or vehicle in which portable toilets are utilized. Chemicals are available to mask the smell, but they typically have their own unpleasant odors and must be stored where storage space is at a premium.

Other types of toilets for boats and other recreational vehicles operate on a pump-out system. That is, the vehicle or vessel must be taken to a specialized pump-out facility where tubes are connected to a flushing system to carry rinsing water into the waste receptacle of the onboard toilet, and from the waste receptacle into a municipal sewage discharge system. An onboard pump-out type toilet has one advantage in that since the waste receptacle is not removed, it can be made relatively air tight. Consequently, unpleasant odors are less of a problem.

However, a pump-out toilet system has significant disadvantages in that large quantities of water are required to adequately entrain and carry the excrement material from the onboard receptacle into the municipal sewage system. This places a considerable demand on the requirements for fresh water at such installations. Also, since the pump out stations are of such a specialized nature, they are expensive to construct and are not always readily available.

Another waste management system which has been devised involves the onboard incineration of excrement materials in a toilet system located on a boat or other recreational vehicle. Such a system requires bottled, combustible gas and an incineration chamber. A slurry of entrained wastes is sprayed into the incineration chamber in which a jet of gas is burning. The high heat of the burning gas quickly evaporates the water entraining the solid waste material and incinerates the solid waste material itself, leaving nothing but a small quantity of incinerated ash. One such system is described in U.S. Pat. No. 3,912,598.

While conventional onboard waste incineration systems can perform their intended function, the controls for such systems involve the manual manipulation of valves and the lighting of burners which require a thorough knowledge of the manner of operation of the system. Also, unless the valves and burners are operated in precisely the correct sequence and for a proper duration, a conventional, onboard excrement incineration system can malfunction, thereby causing sewage overflows, clogging of lines, damage from excessive incineration temperatures, and other problems in the system. Moreover, these problems can occur even if an individual thoroughly familiar with the system tends to its operation. These problems are due to changes in the duration and frequency of valve and burner operation which occur with varying volumes of waste to be processed and due to varying volume levels in the various tanks.

SUMMARY OF THE INVENTION

In one broad aspect the present invention is a method for automatically controlling the incineration of solid wastes in a self contained toilet. The operating mechanical components of such a system include a raw waste deposit container, such as a toilet bowl, an initial receptacle for receiving unprocessed raw waste, a macerator, a holding tank, a waste withdrawal pump, an incineration chamber, a clean water pump, a clean water reservoir such as a toilet water closet, and a manually operated flushing actuator.

According to the automated method of controlling incineration, an electronic holding tank level signal is generated indicative of volume of material in the holding tank. The holding tank level signal is compared with a predetermined upper holding tank volume limit signal. The waste withdrawal pump is actuated to pump down the contents of the holding tank to a predetermined lower holding tank volume limit level. These contents are transferred to the incineration chamber. The incineration chamber is actuated to incinerate the contents transferred thereto from the holding tank. Actuation of the waste withdrawal pump and actuation of the incineration chamber is terminated once the holding tank level signal reaches the lower holding tank volume limit level.

Preferably, the method also includes the steps of monitoring the incineration chamber temperature and temporarily terminating actuation of the waste withdrawal pump when the incineration chamber temperature falls below a predetermined lower incineration chamber temperature limit. This drop in temperature occurs when enough of the waste slurry material has been sprayed into the incineration chamber to absorb the heat produced by the incineration chamber burners. If the temperature falls below the lower incineration chamber limit the solid material will not properly incinerate. Therefore, when the temperature falls to the predetermined lower incineration chamber temperature limit, the waste withdrawal pump is shut off.

With the temporary cessation of injection of new material, the heat within the incineration chamber can build, thereby vaporizing the water and incinerating the solid material. Once the incineration chamber temperature rises above a predetermined upper incineration chamber temperature limit, the incineration chamber is able to handle additional material from the holding tank. At this time the waste withdrawal pump is actuated again to pump additional waste material as a slurry into the incineration chamber.

The lower incineration chamber temperature limit may be established at a temperature of 600 degrees Fahrenheit, and the upper incineration chamber limit may be established at a temperature of 800 degrees Fahrenheit. The temperature within the incineration chamber will thereby be maintained within this temperature range under normal circumstances while the incineration chamber is operating.

In a preferred practice of the method of the invention, the incineration chamber temperature is compared to a predetermined excess incineration chamber temperature limit, for example 1000 degrees Fahrenheit. The waste withdrawal pump and the incineration chamber burners are deactuated when the incineration chamber temperature exceeds the excess incineration chamber temperature limit. This safeguard automatically shuts down the system in a controlled fashion if the temperature within the incineration chamber rises to too great a level. This prevents damage to the incineration chamber and to other parts of the system should the waste withdrawal pump malfunction or should a blockage occur in the waste withdrawal line from the holding tank to the incineration chamber.

In the preferred practice of the invention the incineration chamber temperature is ascertained from a pair of redundant temperature sensors. That is, duplicate temperature sensors are employed in the incineration chamber and provide temperature outputs which are digitized. These sensors are located side by side so that the digitized outputs should be substantially equal to each other if both sensors are operating properly. However, if one of the temperature sensors should malfunction, the redundant temperature sensors will then provide unequal temperature indications. At this time the waste withdrawal pump and the incineration chamber burners are deactivated and the system enters a diagnostic routine to alert the operator to the condition and to allow appropriate action to be taken.

For proper operation of the solid waste excrement disposal system it is important to prevent solids from settling out in the holding tank. To the contrary, the contents of the holding tank should be maintained as a suspended slurry of solids in liquid. Therefore, the contents of the holding tank are preferably periodically recirculated through the macerator and through the initial receptacle for receiving unprocessed raw waste. The length of the period between recirculation cycles is preferably adjustable through the microcontroller employed in the system of the invention. This not only prevents settling of solids in the holding tank until the holding tank level signal reaches the predetermined upper holding tank volume limit, but also serves to break down solids from the initial receptacle on a periodic basis.

Since the self contained excrement disposal system employs a user operated flushing actuator, it is desirable for actuation of the flushing actuator to produce a flush indication signal. According to the method, a periodic check is performed to detect the presence of the flush indication signal. Once the flush indication signal is detected, the clean water pump is operated to flush clean water through the raw waste deposit container to the initial receptacle for receiving unprocessed raw waste.

The self contained automated toilet of the system is normally installed in a recreational vehicle of some type which is powered by a twelve volt battery. The signals required according to the invention are produced from a microcontroller which is powered by the vehicle battery through appropriate voltage regulation devices. To ensure proper operation of the microcontroller, the voltage level of the battery is monitored on a cyclical basis. An alarm indication is provide when the voltage level falls below a predetermined level. When current is being drawn from a battery, the voltage level of the battery will fall. Consequently, the system may be set to provide an alarm indication when the voltage level falls below a level of perhaps nine volts, even though the voltage level is stepped down from that voltage to operate the microcontroller.

The system is preferably also provided with a display system and a means for an operator to provide inputs to the system. The levels in the clean water tank, the initial receptacle and the holding tank are monitored. Visible indicia of the holding tank level signal and the levels in the clean water tank and in the initial receptacle are provided on the display console, as is a display of the battery condition. The display console may include the display of other useful information as well, such as the temperatures of the redundant sensors. In addition, messages concerning the last five error signals can be displayed.

By employing the method of the invention, a self contained toilet or solid waste incineration system is provided which is especially useful on boats and automotive recreational vehicles. The unique automated waste management system of the invention requires no special plumbing, chemical additives or holding tanks. It can be easily installed in any motor home, boat or portable sanitation system. Furthermore, by employing the method of the invention, a self contained automated toilet is provided which is completely odor free, economical and environmentally safe.

A self contained toilet automatically controlled according to the invention eliminates the need for large holding tanks, chemically treated water and the unpleasant chore of emptying a tank system. The user does not have to worry about chemical smells, stains and the problems of storing bulky chemical containers. In fact, all that is required for manual maintenance of the system is to periodically vacuum out the ash container of the incineration chamber. This process may be performed with an ordinary portable vacuum cleaner, and takes just a few minutes. The sterile ash which results from incineration of the waste in the incineration chamber may be easily disposed of and has no odor. Also, it does not harm the environment.

A self contained toilet employing the automated method of control according to the invention allows a user greater travel freedom without worrying about violation of pollution regulations. The control system of the invention may be practiced safely, even in relatively crowded harbors and mooring areas.

A self contained toilet operating according to the method of the invention is quite compact. It may be constructed to have a width of only sixteen inches, a depth of only twelve inches, and a height of only sixteen inches. It will fit easily into almost any bathroom or head. It may also be installed in any available storage space or out of the way location, such as the engine room of a boat. Its small size enables it to operate unnoticed without consuming valuable storage space.

The method of the invention employs low cost, energy efficient fuels which are typically available and used for cooking on most recreational vehicles and boats. The incineration chamber of the system preferably utilizes propane. Although butane may be employed, it is not as efficient as propane.

The invention may be described with greater clarity and particularity by reference to the accompanying drawings.

DESCRIPTION OF IMPLEMENTATION OF THE EMBODIMENT

Figure 1:
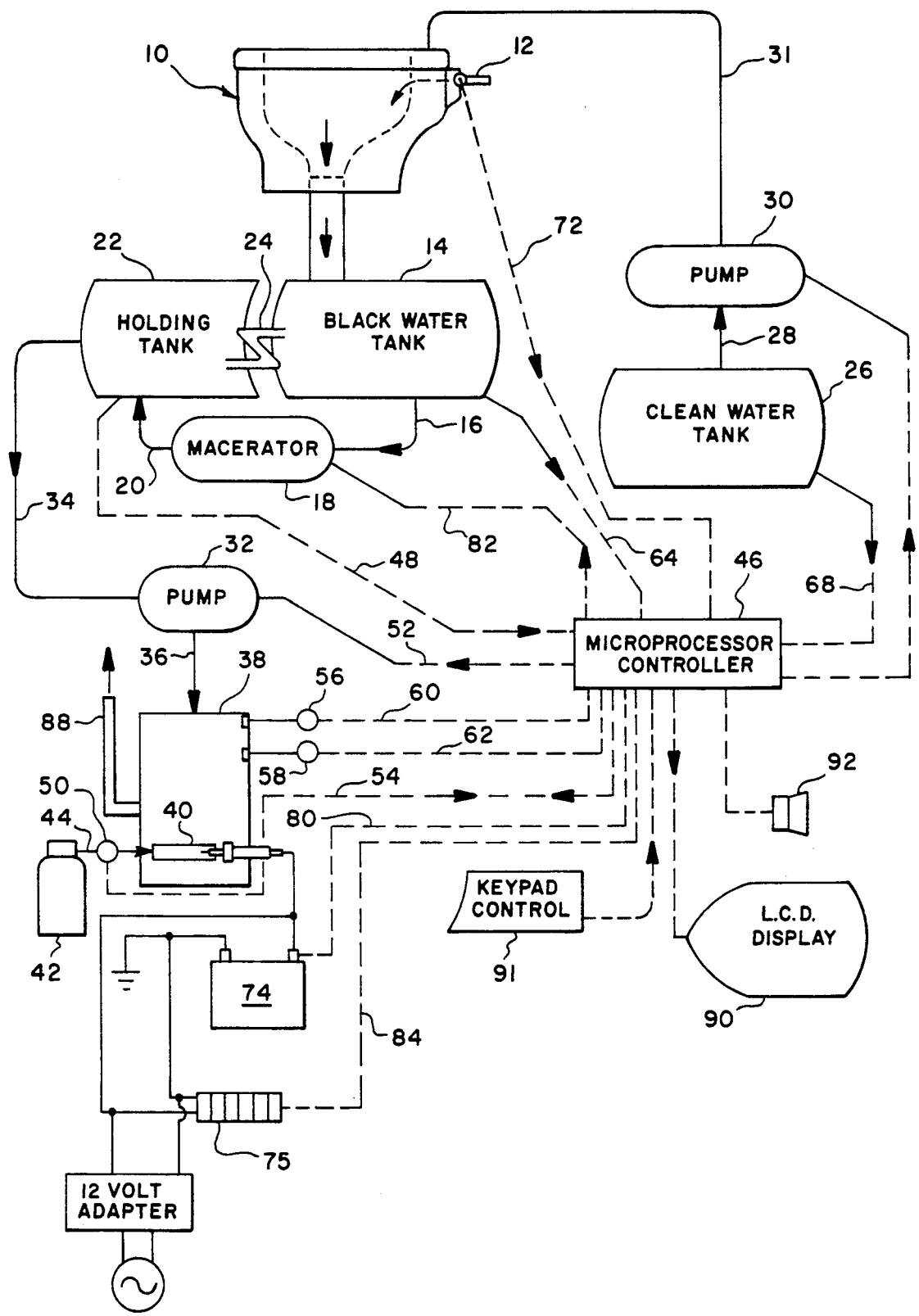
FIG. 1 is a block diagram of a self contained, excrement disposal system which is used to carry out the method of the invention.

FIG. 1 illustrates a self contained automatic toilet or excrement disposal system. The system of FIG. 1 includes a number of operating components. Specifically, the self contained automatic toilet of FIG. 1 employs a conventional raw waste deposit container in the form of a toilet bowl 10. The toilet bowl 10 has a manually operated flushing actuator indicated by the manually operated flushing valve 12. The toilet bowl 10 is connected to an initial receptacle 14 for receiving unprocessed waste. The receptacle 14 may be referred to as a black water tank. The drain of the black water tank 14 is coupled by line 16 to a macerator 18, the outlet line 20 of which is connected as an inlet to the holding tank 22.

A return path exists from the holding tank 22 back to the black water tank 14. Actually, the black water tank 14 and the holding tank 22 may be separate compartments of a single tank separated from each other by a coarse, porous baffle indicated diagrammatically at 24. The return path from the holding tank 22 back to the black water tank 14 is through the baffle 24, which will allow passage of a liquid slurry, but which prohibits the passage of large particles of solid material.

The system also includes a clean water reservoir 26 connected by line 28 to a clean water pump 30. The clean water pump 30 is connected to the toilet bowl 10 by line 31. The operation of the clean water pump 30 is controlled in response to operation of the user operated flushing actuator 12.

The system also includes a waste withdrawal pump 32 which is a vacuum pump that receives an input from the drain 34 of the holding tank 22 and which has an output line 36 connected to spray nozzles in the incineration chamber 38. A burner system 40 within the incineration chamber 38 receives propane gas from a fuel reservoir 42 through an inlet line 44 having a valve 50.

The operation of the entire system is automatically controlled by a microcontroller 46. A suitable microcontroller which may be employed as the microcontroller 46 may be selected from the Intel 8048 family of microcontrollers manufactured by Intel Corporation located in Santa Clara, Calif. the microcontroller 46 provides an output to a visual LCD display 90 and an audible horn 92 and receives operator inputs from a keypad control 91.

The microcontroller 46 receives various sensor inputs and provides various control outputs, all of which are indicated by dotted line connections in FIG. 1. Specifically, the microcontroller 46 receives a holding tank level signal which is digitized from the input signal appearing on line 48 from a level sensor that monitors the level of the contents of the holding tank 22. The microcontroller 46 also provides a digital output to control the on/off operation of the waste withdrawal pump 32 transmitted on line 52. The microcontroller 46 also provides a signal on line 54 to ignite the burner 40 in the incineration chamber 38 and to operate a valve 50 in the fuel line 44 from the fuel tank 42 to the burner 40. The control signal on line 54 initiates ignition and maintains operation of the incineration chamber 38 and opens and maintains valve 50 in an open condition.

The microcontroller 46 receives redundant temperature inputs from a pair of thermoelectric thermometers 56 and 58 on temperature sensing lines 60 and 62, respectively. The redundant temperature sensors 56 and 58 in the incineration chamber 38 respectively produce a pair of raw temperature signals. The temperature signals on lines 60 and 62 are digitized within the microcontroller 46.

The microcontroller 46 also receives a liquid level input on line 64 from a level sensor that measures the level of liquid in the black water tank 14. Similarly microcontroller 46 receives a liquid level indication signal on line 68 which is connected to a sensor that measures the level of clean water in the clean water reservoir 26. When actuated, the flushing actuator 12 also provides a signal on line 72 that is transmitted to the microcontroller 46 to detect operation of the user operated flushing actuator 12.

Power to the microcontroller 46, as well as to the waste withdrawal pump 32, freshwater pump 30, and the macerator 18, is supplied from a conventional twelve volt bolt battery 74 of the type used to power conventional recreational vehicles. The system is preferably equipped with a 12 volt adapter so that it can alternatively receive power from a conventional alternating current power source when such a source is available. Voltage to the microcontroller 46 is stepped down through a conventional voltage regulating control (not shown) so that the microcontroller 46 receives a five volt direct current power input. The microcontroller 46 also has a voltage monitoring input directly from the twelve volt battery 74 on control line 80.

The microcontroller 46 provides a control output to the macerator 18 on line 82. A conventional power input to the macerator 18 (not shown) is provided from the battery 74. Similarly, the waste withdrawal pump 32 has a power input (not shown) from battery 74 but is controlled by the microcontroller 46 by signals on line 52.

In the complete operation of the system, water from the clean water reservoir 26 is pumped through the toilet bowl 10 by means of the pump 30 in response to actuation of the user operated flushing actuator valve 12. The water from the clean water reservoir 26 flows through the toilet bowl 10, carrying with it excrement which is deposited as unprocessed raw waste in the initial receptacle 14.

Unprocessed raw waste is passed through line 16 from the black water tank 14 through the macerator 18 and through line 20 to the holding tank 22. An internal pump within the macerator 18 draws entrained waste from the black water tank 14 through outlet line 16. This waste is broken up into a slurry within the macerator 18 and is discharged into the holding tank 22. The recirculating path through baffle 24 allows a waste slurry to be returned to the black water tank 14.

Once the level of liquids has built up sufficiently in the holding tank 22, the contents of the holding tank 22 are pumped out as a slurry by the waste withdrawal pump 32 through outlet line 34 to line 36. The slurry is discharged as a small stream into the incineration chamber 38. Previously, the burner 40 is actuated to preheat to a predefined temperature the incineration chamber 38 and incinerate the material discharged into it. The burner receives fuel from the tank 42. The gaseous contents of the incineration chamber 38 are discharged through an outlet flue or stack 88 to the atmosphere.

The exhaust emanating from the flue 88 is not contaminated. To the contrary, the heat within the incineration chamber 38 is sufficient so that the vaporized or gaseous exhaust products emanating through the exhaust 88 are primarily comprised of water vapor and carbon dioxide. The other products of incineration remain in the incineration chamber 38 as a fine ash. This ash is ecologically neutral and does not represent a source of contamination to the environment.

Figure 2:
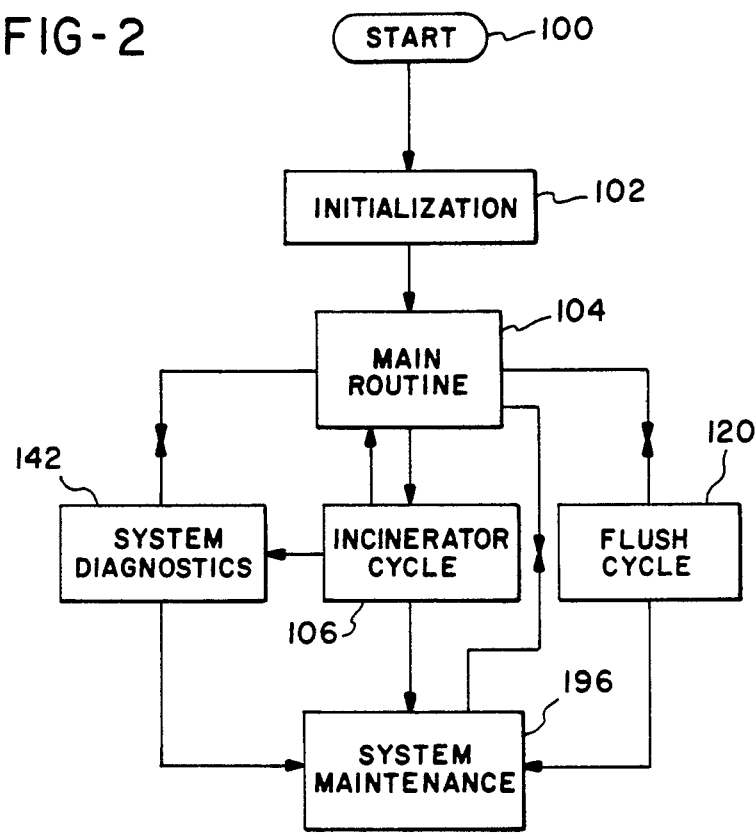
FIG. 2 is a flow chart of the entire software for the microcontroller in the system of FIG. 1.

FIGS. 2 through 7 illustrate the manner of automated control effectuated by the microcontroller 46. FIG. 2 illustrates diagrammatically in flow chart form the overall operation of the system. Specifically, the operational sequence commences when the microcontroller 46 receives power as indicated at the starting step 100. From the starting step 100 the various registers within the system are initialized by the initialization routine indicated generally at 102. The setting of these registers includes the setting of the upper allowable holding tank level limit which is indicative of an upper allowable level of contents in the holding tank 22. Also, the register for a predetermined lower holding tank limit signal is set. These and other like registers, receive inputs from an EPROM-like device, some of which may be adjusted by the operator as desired.

The initialization step 102 also involves setting of a low water supply level register which provides a low water supply level signal associated with a minimum acceptable level of clean water in the reservoir 26. This register may also be adjusted by the operator, depending upon the size of the clean water reservoir 26, and the likely demands for water which are placed on the clean water reservoir 26.

During the initialization routine 102 the microcontroller also performs certain checks before entering the main routine 104. Specifically, the voltage level on input line 80 from the battery 74 is digitized and checked against a predetermined minimum voltage level, which may, for example, be nine volts. If the voltage level of the signal on line 80 falls below this predetermined minimum level the microcontroller 46 will not enter the main routine 104, but will provide an alarm indication during the initialization step 102.

Figure 3:
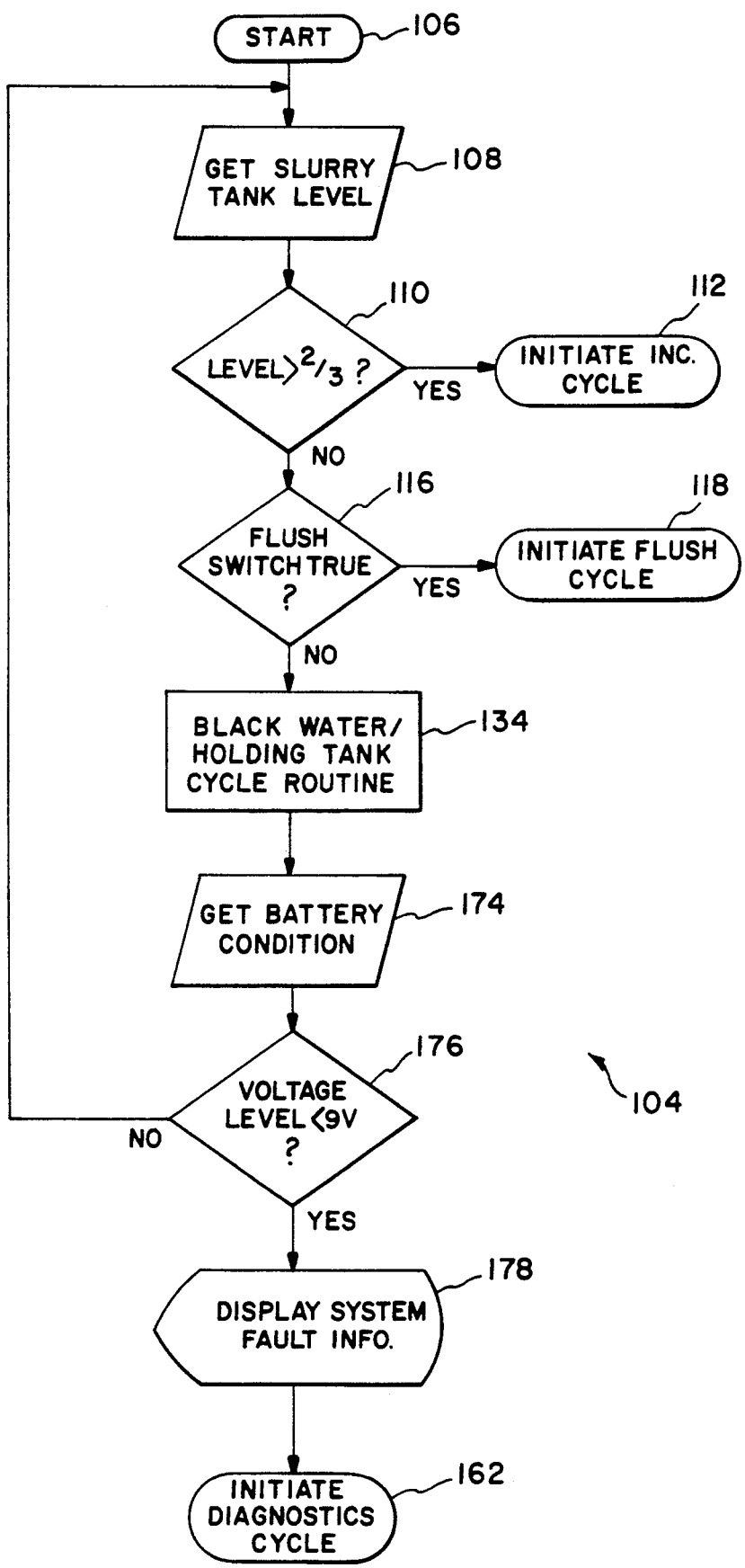
FIG. 3 is a flow chart for the main routine in the software shown in FIG. 2.

Once the initialization step 102 has been completed, the system enters the main routine illustrated in FIG. 3. From the starting step indicated at 106 the microcontroller first digitizes the input from line 48 from the holding tank 22 to generate a holding tank level signal indicative of the level of contents of the holding tank 22 at step 108. Once the holding tank level signal has been acquired it is compared with the predetermined upper holding tank level signal which is indicative of an incineration process initiation trigger. This upper holding tank level signal may, for example, be set at two thirds of the total capacity of the holding tank 22. At step 110 the microcontroller 46 determines whether or not the holding tank level signal extracted from the input on line 48 exceeds the predetermined upper level limit of two thirds of the capacity of the holding tank 22. If so, the system enters the incineration cycle 106, depicted in FIG. 2, at step 112.

Figure 4:
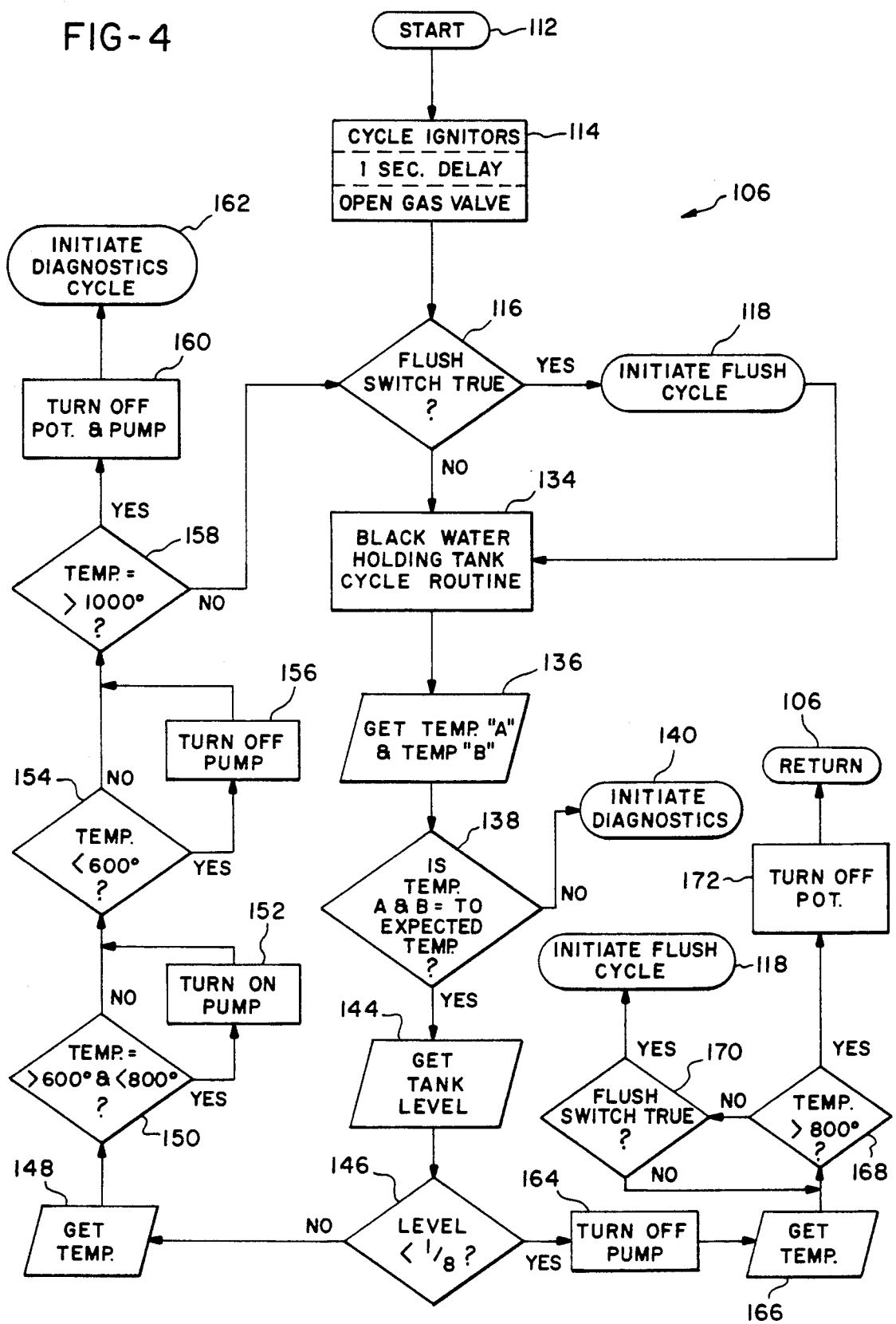
FIG. 4 is a flow chart for the incineration cycle in the software of FIG. 2.

The incineration cycle 106 is depicted in detail in FIG. 4. From the initial step 112 the microcontroller provides an actuating control signal on line 54 to the incineration chamber 38 to enable the electrical ignition circuitry of the burner 40. After a one second delay the microcontroller 46 then opens the valve 50 to the burner 40 in line 44 so that the burner 40 begins to receive fuel from the fuel tank 42 through fuel inlet line 44. By this time the electrical igniters of the burner 40 are operating significantly to ignite the fuel from the line 44. All of these steps are taken in rapid sequence and are indicated generally at 114 in FIG. 4.

At this point the microcontroller 46 then checks the status of the user operated flushing actuator 12. If the flushing actuator 12 has been manually actuated, the manual operation of the device will have generated an electrical flush actuation signal on line 72. Each time the system progresses through the incineration cycle 106 it polls the flushing actuator 12 at step 116 in order to detect the presence of a flush actuation signal on line 72. If such a signal is detected, the system branches to step 118 to initiate the flush cycle. The flush cycle is indicated generally at 120 in FIG. 1 and in detail in FIG. 5.

Figure 5:
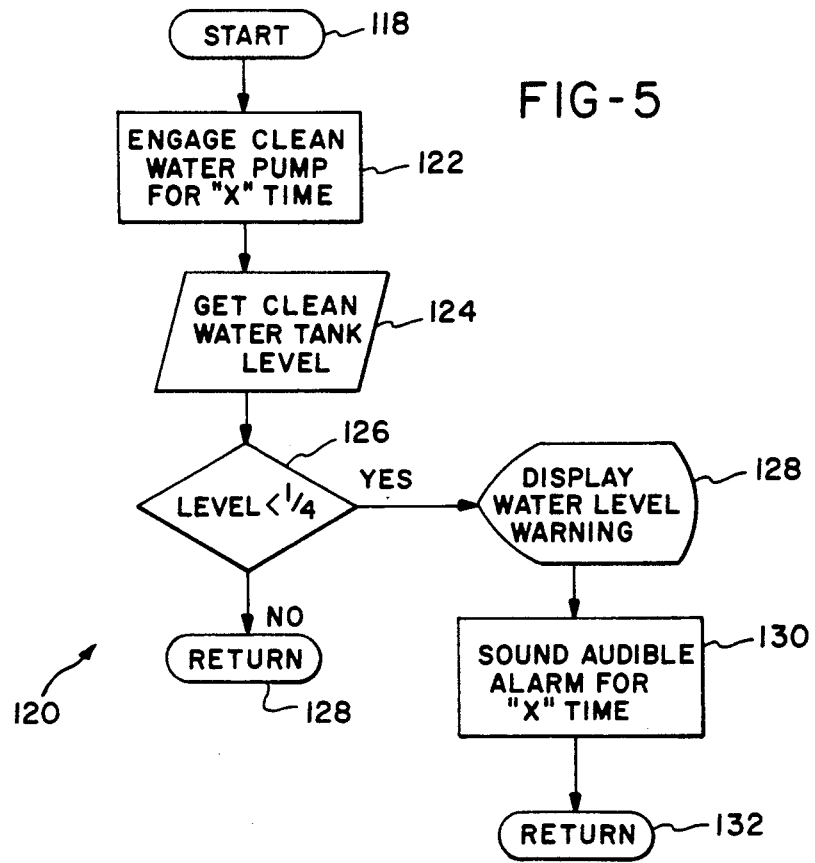
FIG. 5 is a flow chart for the flush cycle in the software of FIG. 2.

With the initiating step 118 of the flush cycle 120 as indicated in FIG. 5, the microcontroller 46, upon detecting the presence of a flush actuation signal from line 72, operates the clean water pump 30 for a user definable period of time, typically from about two to about six seconds, to pump clean water from the clean water reservoir 26 to the raw waste deposit container 10. This step is indicated at 122 in FIG. 5.

Following the discharge of water from the clean water tank 26, it is appropriate to ascertain whether or not the clean water supply is in danger of being depleted. The clean water level signal derived from the signal on line 68 is generated as an indication of level of clean water in the clean water reservoir 26. This signal is acquired at step 124 in FIG. 5. The clean water level signal is then compared with a predetermined low clean water supply level signal at step 126 in FIG. 5, following operation of the clean water pump 30 which is performed at step 122. For example, the predetermined low clean water supply level may be set at one quarter of the volume of the clean water tank 26.

If the clean water level signal generated from the signal on line 68 is above the low water supply level, the system returns to the incineration cycle 106 depicted in FIG. 4 at step 128. If, on the other hand, the clean water level signal has fallen below the low water supply level, the program branches from step 126 to step 128 wherein a warning of a low clean water level is visually displayed on the display 90. Also, the audible alarm 92 is sounded for a predetermined time, such as five seconds, at step 130. The system then returns to the incineration cycle of FIG. 4 at step 132.

In the incineration cycle 106, whether or not the system has branched to the flush cycle 120 of FIG. 2 which is illustrated in detail in FIG. 5, it enters the routine for recirculating material from the holding tank 22 through the black water tank 14, back through the macerator 18, and returning it to the holding tank 22. This step is indicated at 134 in FIG. 4.

The step 134 involves cyclically actuating the macerator 18 to pump out and macerate the contents of the black water tank 14. The contents of the holding tank 22 will flow back into the black water tank 14 through the baffle 24 as the pump within the macerator 18 forces the slurry through the line 20 into the holding tank 22. This results in a cyclical, periodic recirculation of the contents of the holding tank 22 through the macerator 18 and the initial receptacle for receiving unprocessed raw waste, namely the black water tank 14, and back to the holding tank 22. This is done to reduce solids to a slurry and to prevent solidification of the mixture in the holding tank 22.

Following performance of the black water slurry tank cycle routine at 134, the system proceeds to read the incineration chamber temperatures on lines 60 and 62, respectively. These signals from lines 60 and 62 are acquired from the redundant temperature sensors 56 and 58 at step 136 in the incineration cycle routine of FIG. 4. The sensors 56 and 58 are respectively indicated as the "A" and "B" sensors in the drawings. The temperature signals from lines 60 and 62 are then digitized and compared to each other at step 138 in FIG. 4 to ascertain whether or not they are equivalent, which they should be. If the signals from lines 60 and 62 differ, the system branches to initiate a diagnostics routine at step 140. The diagnostics routine is indicated at 142 in FIG. 2, and will subsequently be described.

If the temperature signals from the incineration chamber 38 on lines 60 and 62 are equivalent, the system proceeds to acquire the holding tank level signal at step 144 in the incineration cycle in FIG. 4. The holding tank level signal is then compared with a predetermined lower holding tank volume limit signal which is internally programed into the microcontroller 46. The lower holding tank volume limit signal is indicative of substantial evacuation of the holding tank 22. This comparison is performed at step 146 in FIG. 4. This signal may be set, for example, at one eighth of the volume of the holding tank 22.

If the holding tank 22 has not been substantially evacuated, at step 148 the microcontroller 46 will examine the current incineration chamber temperature from temperature sensors 56 and 58. The microcontroller 46 will then compare the incineration chamber temperature signal derived from temperature sensors 56 and 58 with both a preset upper incineration chamber temperature limit and with a preset lower incineration chamber temperature limit. The upper limit may, for example, be set at eight hundred degrees Fahrenheit while the lower limit may, for example, be set at six hundred degrees Fahrenheit.

If the incineration chamber temperature signal from sensors 56 and 58 exceeds the upper incineration chamber temperature limit, this means that the incineration chamber 38 can handle an additional volume of the slurry from the holding tank 22. Accordingly, the waste withdrawal actuation signal on line 52 is generated to actuate the waste withdrawal pump 32 and begin pumping quantities of the slurry into the incineration chamber 38. The pump 32 is turned on at step 152.

Following the actuation of the pump 32, or in the event that the temperature sensors showed that the incineration chamber temperature is not within the range between the upper and lower incineration chamber temperature limits, the system proceeds to step 154. At this time the actual incineration chamber temperature from sensors 56 and 58 is compared against the lower incineration chamber temperature limit. If this comparison reveals that the incineration chamber temperature signal is less than the lower incineration chamber temperature limit, this is an indication that no more of the slurry should be injected into the incineration chamber at this time. This is because the material already present in the chamber has absorbed heat sufficiently to lower the chamber temperature to the point just before that at which complete incineration becomes improbable. Accordingly, the system proceeds to step 156 which terminates the actuation of the waste withdrawal pump 32 by extinguishing the actuating signal on line 52.

At this time, as well as in the event that the incineration chamber temperature signal is still above the lower incineration chamber temperature limit, the system proceeds to step 158. At step 158 the incineration chamber temperature from the sensors 56 and 58 is compared with a preset excessive incineration chamber temperature safety limit that is greater than the upper incineration chamber temperature limit of step 150. For example, the preset excessive incineration chamber temperature safety limit may be one thousand degrees Fahrenheit. If this comparison reveals that the incineration chamber temperature as determined by the sensors 56 and 58 is below the excessive incineration chamber temperature limit, the system returns in a loop to step 116 to again check the manually operated flushing actuator 12.

On the other hand, if the incineration chamber temperature signal derived from the temperature sensors 56 and 58 is greater than the preset excessive incineration chamber temperature limit, an unsafe condition exists. The equipment can be damaged if the incineration chamber temperature becomes too hot. Therefore, in this event the system proceeds to step 160 where current to the incineration chamber burner 40 is removed and the burner valve 50 is closed by removal of the control signal on line 54. Concurrently, the actuating signal 52 to the waste withdrawal pump 32 is terminated, so that no more waste slurry enters the incineration chamber 38. Having accomplished this controlled shut-down, the system then proceeds to initiate a diagnostics cycle at step 162 in which an excessive temperature alarm indication is generated, as will be described later.

With the system properly operating to incinerate waste, the microcontroller proceeds repetitively in a loop from step 116 through the step of checking to see whether the holding tank level signal has fallen to the level of the predetermined lower holding tank limit signal, which is performed at step 146, and on through the comparison step 158. However, at some point the holding tank level signal will reach the predetermined lower holding tank trigger signal level. When this occurs the comparison at step 146 is indicative of completion of substantial evacuation of the holding tank 22. When this condition exists the system proceeds to step 164, rather than step 148.

At step 164 the actuation signal on line 52 to the waste withdrawal pump 32 is terminated. The system then acquires the current temperature of the incineration chamber 38 from sensors 56 and 58. This is done at step 166. The microcontroller 46 then first determines whether or not the temperature of the incineration chamber 38 as determined from the temperature sensors 56 and 58 is greater than the upper incineration chamber temperature limit. This comparison is performed at step 168. If the incineration chamber temperature signal is still below the upper incineration chamber temperature limit, this is indicative that there is still waste material remaining in the incinerator 38 which must be incinerated. Consequently, the system does not shut off the incinerator 38 at this time, but instead again checks the condition of the manually operated flushing actuator 12 at step 116.

If polling of the manually actuated flushing actuator 12 reveals that it has been actuated, as indicated by the presence of a signal on line 72, the microcontroller 46 proceeds to initiate a flush cycle at step 118, whereupon the system enters the flush cycle 120 which is depicted in detail in FIG. 5 and which has previously been described. On the other hand, if the check reveals an absence of a signal on line 72, indicating that the flush valve 12 has not been actuated, the system loops back to step 168 and again compares the actual incineration chamber temperature signal from sensors 56 and 58 at step 138 with the upper incineration chamber temperature limit at step 168.

Eventually all of the waste material within the incineration chamber 38 will be incinerated, and the temperature within the incineration chamber will begin to rise. Ultimately, the comparison at step 168 will reveal that the incineration chamber temperature signal currently derived from sensors 56 and 58 is greater than the upper incineration chamber temperature limit. At this time the system will proceed from step 168 to step 172. At step 172 the microcontroller 46 terminates the incineration chamber actuation signal on line 54, which first shuts off the valve 50 from the fuel line 44 and then removes the ignition electricity from the burner 50. The system then returns to the main program with step 106, which is the start of the main routine depicted in FIG. 3.

Upon reentering the main routine of FIG. 3 the microcontroller 46 again proceeds through steps 106, 108 and 110, as previously described. Since an incineration cycle has just been completed, the comparison at step 110 will reveal that the level of the contents of the holding tank 22 is not above the predetermined allowable holding tank level signal. Consequently, the microcontroller 46 will proceed to step 116, whereupon it again checks the status of line 72 to determine whether or not the flushing actuator 12 has been manually operated. If it has, it will proceed to initiate the flush cycle at step 118 and commence the flush cycle of FIG. 5, previously described. If not, it will proceed to step 134, whereupon it initiates the recirculation of the slurry in the holding tank 22 back through the black water tank 14 and the macerator 18 as previously described.

At this point the microcontroller 46 then commences certain checks which are performed less frequently than the incineration cycle of FIG. 4 and the flush cycle of FIG. 5. Specifically, the microcontroller 46 then checks the voltage level of the battery 74 as determined by the signal on line 80 at step 174. The voltage level of the battery 74 as monitored by the signal on line 80 is then compared with a predetermined voltage level, for example nine volts, at step 176. If the voltage level as indicated by the signal on line 80 is not below the predetermined minimum voltage level, the microcontroller proceeds in a loop and returns again to step 108. On the other hand, if the voltage level has fallen below the minimum allowable voltage, the microcontroller 46 provides an alarm indication, which may include both visual and audible alarms at step 178. The microcontroller 46 then proceeds to step 162 to initiate the diagnostics routine 142.

Figure 6:
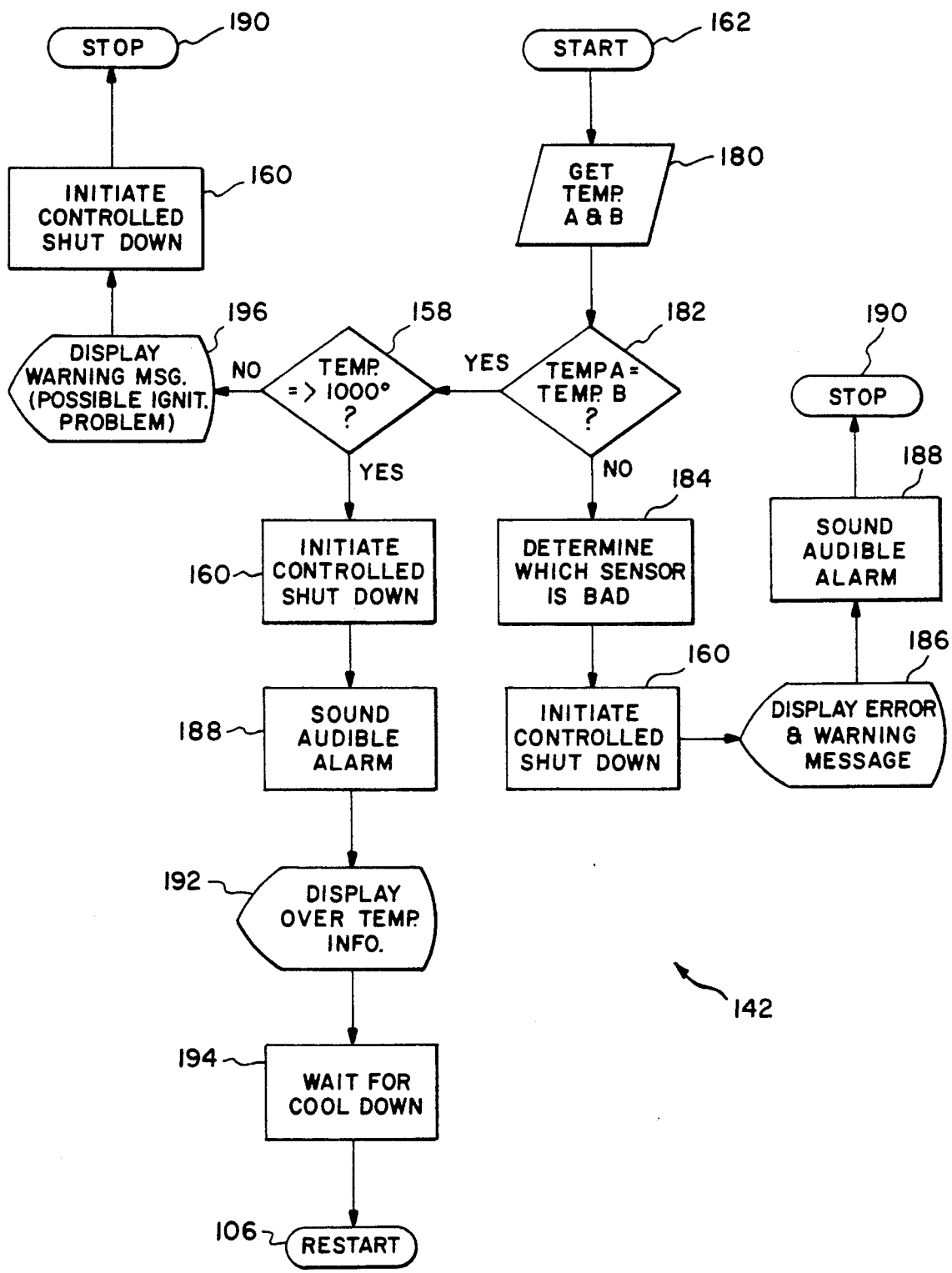
FIG. 6 is a flow chart for the systems diagnostics cycle of the software shown in FIG. 2.

The diagnostics routine 142 is illustrated diagrammatically in detail in FIG. 6. From the initiation step 162 the microcontroller first acquires the incineration chamber temperature signals from sensors 56 and 58 on lines 60 and 62, respectively, at step 180. The system then again compares these signals to each other to determine whether or not they are equivalent at step 182. If they are not equivalent a check is made to determine which sensor is bad at step 184. That is, the incineration chamber temperatures derived from sensors 56 and 58 are compared separately with the upper and lower incineration chamber temperature limits. If one of the sensors lies within these limits and the other does not, this is an indication that the sensor providing a signal outside of these limits is the bad sensor.

In any event the system proceeds to step 160 to initiate a controlled shut-down of the waste withdrawal pump 32 and the incineration chamber 38, as previously described. The microcontroller 46 then displays an error and warning message in the display 90 at step 186. At this time if there has been a determination as to which sensor appears to be bad, this information will be displayed. In either event the system proceeds to step 188 to sound the audible alarm 92. The system then proceeds to step 190 where it stops until there is operator intervention.

If the microcontroller 46 entered the diagnostics routine of FIG. 6 due to a cause other than unequal temperature indications from the sensors 56 and 58, the comparison at step 182 will reveal that the incineration chamber temperatures from the two sensors 56 and 58 are equal. Consequently, the system will proceed to step 158 to determine whether or not the incineration chamber temperature signal from the sensors 56 and 58 is greater than the predetermined excessive incineration chamber temperature. If it is, the system proceeds to step 160 to initiate a controlled shut down of the incinerator 38 and the waste withdrawal pump 32 in the manner previously described. It then sounds an audible alarm at step 188 and displays the over temperature information at step 192. That is, a visual display is provided of the actual incineration chamber temperature, which is greater than the predetermined excessive incineration chamber temperature. The microcontroller then enters a timed waiting period at step 194 of predetermined duration, perhaps several minutes. It then attempts to restart the main routine at step 106.

If the problem which initiated the diagnostics cycle of FIG. 6 was neither an unequal reading from the temperature sensors 56 and 58 nor an excessive temperature, as determined at step 158, the system will proceed to step 196, where it displays a warning message in the display 90. This message may be indicative of a possible ignition problem. The microcontroller 196 then initiates a controlled shut-down of the waste withdrawal pump 32 and the incineration chamber 38 at step 160 and proceeds to a halt at step 190 to await operator intervention.

From the steps 190 of the diagnostic cycle at which the system halts the performance of the main routine 104, operator intervention through the system maintenance routine indicated at 146 in FIG. 2, is required to re-enter the main routine 104. In this connection an operator is provided with a keypad control 91 which interfaces with the microcontroller 46 in conjunction with the LCD display 90. The operator can use the maintenance and setup menu of FIG. 7 as an aid for troubleshooting and taking corrective action.

Figure 7:
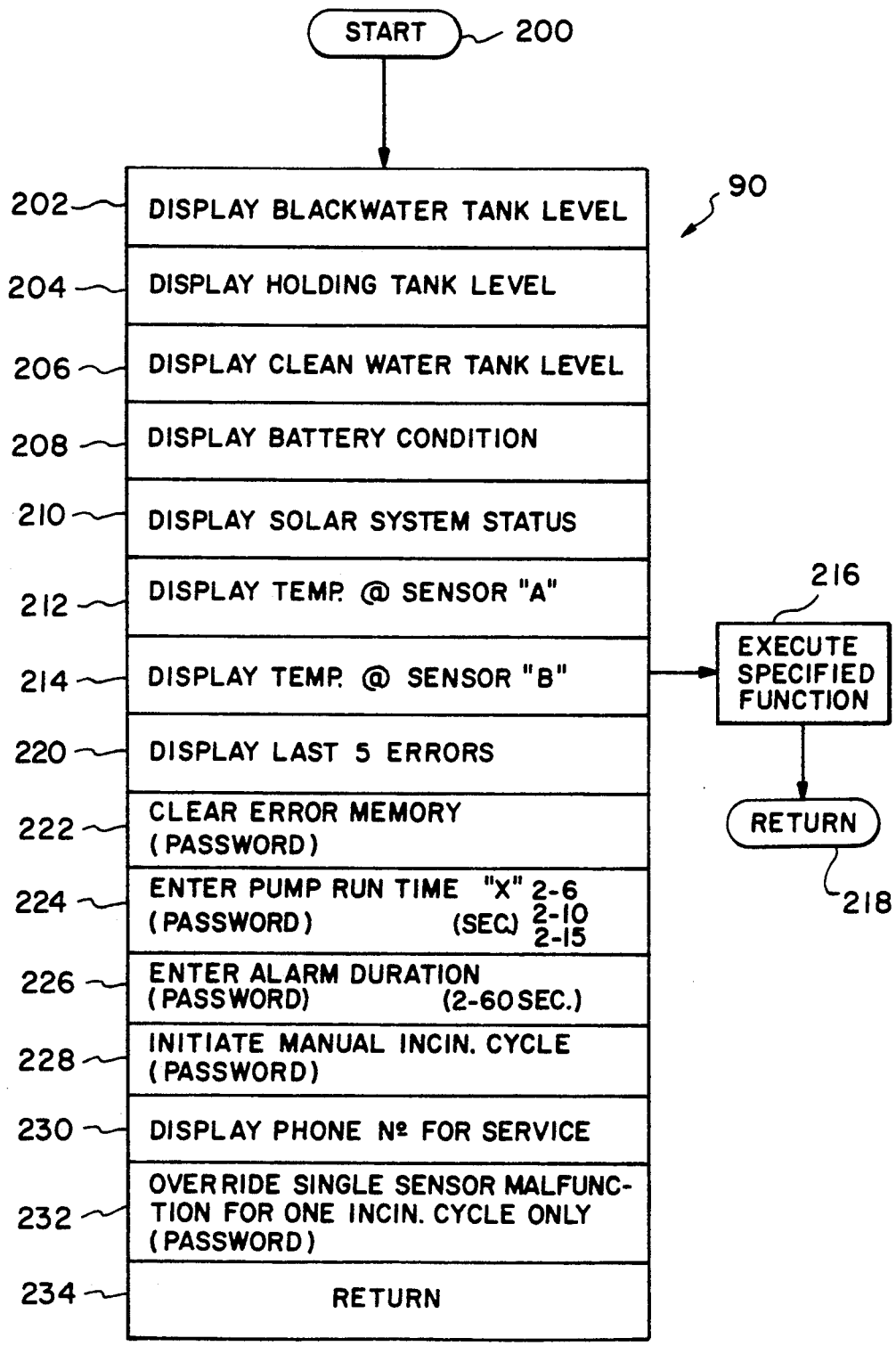
FIG. 7 illustrates the system maintenance setup and menu for the software of FIG. 2.

The start of the maintenance and setup menu is indicated at 200 in FIG. 7. The operator uses a single button on the keypad control 91 to advance through the menu. The initial steps involve the display of various indication signals. For example, the level of the contents of the black water tank 14, as ascertained from the signal on line 64, may be displayed at step 202. Further advancement through the display sequence by depressing the single menu advance button on the keypad 91 advances the system to step 204. At step 204 the level of the contents of the holding tank 22 is displayed, as derived from the signal on line 48. The operator can then advance the display to step 206 where the level of clean water in the clean water tank 26 is displayed, as derived from the signal on line 68. The next advance through the maintenance menu is to step 208. There a digitized display of the battery's voltage level appears at step 208.

The system lends itself to recharging by means of an optional solar panel, shown in phantom at 75 in FIG. 1. Step 210 results in a digitized display of the real time voltage being supplied by the solar panel 75. This status is obtained by the microcontroller 46 via the status input on line 84 in FIG. 1.

At step 212 the incineration chamber temperature signal derived from sensor 56 on line 60 may be displayed. An incremental advance to step 214 results in a display of the incineration chamber temperature signal from sensor 58 on line 62. Thus, the operator can manually determine the operating status of these sensors visually from the LCD display 90.

The next sequential step 232 in the maintenance and setup menu allows the user to override a single sensor malfunction for one incineration cycle only, upon entry of the appropriate password code. That is, upon entry of the password the user uses the keypad control 91 to override the system to re-initiate the incineration cycle at step 112 for a single routine from start to finish. This allows the user to operate the system in a limited manner on a single operational sensor.

If the operator does not choose to exit the maintenance and setup menu accepting all changes and/or functions previously entered, using the keypad control 91 to proceed to step 216, depression of the single button advance of the display is resumed. In this event the system will advance from step 214 to step 220 by depression of the display advancement button. At step 220 the system displays the last five errors which have been detected in the system. This display is particularly useful for locating recurrent problems with specific operating components.

At step 222 the error memory can be cleared by entering an appropriate password into the system through the keypad control 91. This password may be a numerical code entered on the keypad 91. The system then advance to step 224 which allows the user, again with entry of an appropriate password code, to select an appropriate time for the clear water pump 30 to run when actuated. For example, a time between perhaps two and ten seconds can be selected by the operator using the numerical keys on the keypad control 91.

The next sequential depression of the menu selection button causes the system to advance to step 226. In this mode the user, again upon entry of an appropriate password code, can enter a duration for the alarm signal used to actuate the audible horn 92. For example, an alarm duration between two and sixty seconds may be selected.

The next advancement through the maintenance and setup menu to step 228 allows an operator to override the instructions of the main routine and restart the system at step 112 to initiate the incineration cycle depicted in FIG. 4. The instructions to proceed to the starting step 112 of the incineration cycle 106 are entered through the keypad 91, and must be preceded by entry of the appropriate password code. Initiation of the incineration cycle in this manner would normally be done when the system had been stopped at the diagnostics cycle at step 190, once appropriate corrective action has been taken. Also, the initiation of the incineration cycle at step 228 can be performed to test the incineration system.

The next sequential display in the maintenance and setup menu at step 230 is of a stored telephone number to which a user can call for service. By storing the telephone number for the system internally the user is not in a helpless condition when the customer service telephone number has been misplaced or lost.

Step 234 returns the system to the starting step 106 of the main software routine 104, which is depicted in detail in FIG. 3. Should the user wish to return to the maintenance and setup menu of FIG. 7, the maintenance advancement button on the keypad control 91 can be depressed a single time, to return to the starting step 200.

Undoubtedly, numerous variations and modifications of the invention will become readily apparent to those familiar with self contained incineration type waste disposal systems. For example, it is desireable to be able to adjust the time period during which the macerator is actuated to recirculate the contents of the holding tank. This adjustment can be performed through the system maintenance routine illustrated in FIG. 7. Accordingly, the scope of the invention should not be construed as limited to the specific implementation of the method depicted and described herein, but rather is defined in the claims appended hereto.

We claim:

1. A method of automatically controlling an excrement disposal system employing a raw waste deposit container, an initial receptacle for receiving unprocessed raw waste, a macerator, a holding tank, a waste withdrawal pump, an incineration chamber, a clean water pump, a clean water reservoir and a manually operated flushing actuator comprising:

performing a routine for incinerating waste by:

generating a holding tank level signal indicative of level of contents of said holding tank, comparing said holding tank level signal with a predetermined upper holding tank limit signal indicative of an upper operational level of contents in said holding tank, generating a waste withdrawal pump actuation signal when said holding tank level signal exceeds said upper holding tank limit signal to actuate said waste withdrawal pump to pump the contents of said holding tank to said incineration chamber, providing an incineration chamber actuation signal to initiate and maintain combustion in said incineration chamber, comparing said holding tank level signal with a predetermined lower holding tank operational limit signal indicative of substantial evacuation of said holding tank, and terminating said incineration chamber actuation signal and said waste withdrawal pump actuation signal when said holding tank level signal falls below said lower holding tank operational limit signal.

2. A method of automatically controlling an excrement disposal system according to claim 1 further comprising performing a tank flushing routine including:

generating an electrical flush actuation signal responsive to manual user operation of said flushing actuator, repetitively polling said flushing actuator to detect the presence of said flush actuation signal, and operating said clean water pump for a predetermined period of time to pump clean water from said clean water reservoir to said raw waste deposit container upon detection of said flush actuation signal.

3. A method according to claim 2 further comprising generating a clean water level signal indicative of level of clean water in said clean water reservoir, comparing said clean water level signal with a predetermined low water supply level signal following operation of said clean water pump, and generating a low water supply alarm indication when said clean water level signal falls below said low water supply level signal.

4. A method according to claim 1 further comprising:

generating an incineration chamber temperature signal indicative of temperature in said incineration chamber, comparing said incineration chamber temperature signal to a preset lower incineration chamber temperature operational limit, and terminating said waste withdrawal pump actuation signal when said incineration chamber temperature signal falls below said lower incineration chamber temperature operational limit, comparing said incineration chamber temperature signal to a preset upper incineration chamber temperature operational limit, and generating said waste withdrawal pump actuation signal when said incineration chamber temperature signal exceeds said upper incineration chamber temperature limit during said routine for incinerating waste.

5. A method according to claim 4 further comprising: comparing said incineration chamber temperature signal to a preset excessive incineration chamber temperature safety limit that is greater than said upper incineration chamber temperature safety limit, and terminating said incineration chamber actuation signal and said waste withdrawal pump actuation signal and generating an excessive temperature alarm indication when said incineration chamber temperature exceeds said excessive incineration chamber temperature safety limit.

6. A method according to claim 4 further comprising employing redundant temperature sensors in said incineration chamber to produce a pair of raw temperature signals therefrom, digitizing and comparing said temperature signals to each other to ascertain whether or not they are equivalent, ascertaining which of said temperature signals is lowest when said temperature signals are not equivalent, and terminating said waste withdrawal pump actuation signal and said incineration chamber actuation signal and providing a temperature sensor alarm indication when said temperature signals are not equivalent.

7. A method according to claim 1 further comprising cyclically actuating said macerator to recirculate the contents of said holding tank through said macerator and said initial receptacle and back to said holding tank to reduce solids to a slurry and to prevent solidification of the mixture in said holding tank.

8. A method for automatically controlling the incineration of solid wastes in an excrement disposal system employing a raw waste deposit container, an initial receptacle for receiving unprocessed raw waste, a macerator, a holding tank, a waste withdrawal pump, an incineration chamber, a clean water pump, a clean water reservoir, and a manually operated flushing actuator comprising:

generating an electronic holding tank level signal indicative of volume of material in said holding tank, comparing said holding tank level signal with a predetermined upper holding tank operational volume limit signal, actuating said waste withdrawal pump to pump down the contents of said holding tank to a predetermined lower holding tank operational volume level and transferring said contents thereof to said incineration chamber, actuating said incineration chamber to incinerate said contents transferred thereto from said holding tank, and terminating actuation of said waste withdrawal pump and said incineration chamber once said holding tank level signal reaches said lower holding tank volume level.

9. A method according to claim 8 further comprising: monitoring incineration chamber temperature and terminating actuation of said waste withdrawal pump when said incineration chamber temperature falls below a predetermined lower incineration chamber temperature limit and actuating said waste withdrawal pump when said incineration chamber temperature rises above a predetermined upper incineration chamber temperature limit.

10. A method according to claim 9 further comprising comparing said incineration chamber temperature to a predetermined excess incineration chamber temperature limit and deactuating said waste withdrawal pump and deactuating said incineration chamber when said incineration chamber temperature exceeds said excess incineration chamber temperature limit.

11. A method according to claim 9 further comprising ascertaining said incineration chamber temperature from a pair of redundant temperature sensors and deactuating said waste withdrawal pump and said incineration chamber when the said redundant temperature sensors provide unequal temperature indications.

12. A method according to claim 8 further comprising periodically recirculating the contents of said holding tank through said macerator and said initial receptacle for receiving unprocessed raw waste to prevent settling of solids in said holding tank.

13. A method according to claim 8 wherein actuation of said manually operated flushing actuator produces a flush indication signal, and further comprising repeated checking for the presence of said flush indication signal, and operating said clean water pump to flush clean water through said raw waste deposit container to said initial receptacle for a predetermined time period upon detecting the presence of said flush indication signal.

14. A method according to claim 8 in which a battery is employed to provide said signals, and further comprising monitoring voltage level of said battery, and providing an alarm indication when said voltage level falls below a predetermined level.

15. A method according to claim 8 further comprising monitoring levels in said clean water tank, and in said initial receptacle and providing visible indicia of said holding tank level signal and said levels in said clean water tank and in said initial receptacle.

* * * * *